(12) United States Patent
Jensen

(10) Patent No.: US 8,640,765 B2
(45) Date of Patent: Feb. 4, 2014

(54) TWISTED CONDUIT FOR GEOTHERMAL HEATING AND COOLING SYSTEMS

(76) Inventor: Robert Jensen, Montvale, NJ (US)

( * ) Notice: Subject to any disclaimer, the term of this patent is extended or adjusted under 35 U.S.C. 154(b) by 0 days.

(21) Appl. No.: 13/385,378

(22) Filed: Feb. 16, 2012

(65) Prior Publication Data

US 2012/0186776 A1    Jul. 26, 2012

Related U.S. Application Data

(63) Continuation-in-part of application No. 12/660,226, filed on Feb. 23, 2010.

(51) Int. Cl.
    *F24J 3/08*    (2006.01)
(52) U.S. Cl.
    USPC ............................................. 165/45; 62/260
(58) Field of Classification Search
    USPC ............................................. 165/45; 62/260
    See application file for complete search history.

(56) References Cited

U.S. PATENT DOCUMENTS

| | | | | |
|---|---|---|---|---|
| 1,852,489 A | * | 4/1932 | Sullivan | ......................... 165/156 |
| 1,852,490 A | * | 4/1932 | Sullivan | ......................... 165/156 |
| 2,458,826 A | | 1/1949 | Blumberg et al | |
| 2,466,676 A | * | 4/1949 | Boling et al. | .................. 165/169 |
| 2,911,047 A | | 11/1959 | Henderson | |
| 3,062,289 A | | 11/1962 | Eades | |
| 3,189,098 A | | 6/1965 | Haeber | |
| 3,913,668 A | | 10/1975 | Todd et al. | |
| 4,279,544 A | | 7/1981 | Brun et al. | |
| 4,421,136 A | | 12/1983 | Aubert | |
| 4,715,429 A | * | 12/1987 | Mogensen | ....................... 165/45 |
| 4,917,175 A | | 4/1990 | Sakaya et al. | |
| 4,995,450 A | | 2/1991 | Geppelt et al. | |
| 5,329,992 A | | 7/1994 | Tripp | |
| 5,477,914 A | | 12/1995 | Rawlings | |
| 5,630,447 A | * | 5/1997 | Jensen | ........................... 138/115 |
| 5,816,314 A | * | 10/1998 | Wiggs et al. | ..................... 165/45 |
| 6,000,459 A | | 12/1999 | Jeppesen | |
| 6,142,215 A | | 11/2000 | Paulsen et al. | |
| 6,212,896 B1 | | 4/2001 | Genung | |
| 6,860,320 B2 | * | 3/2005 | Johnson et al. | .................. 165/45 |
| 6,979,776 B1 | | 12/2005 | Zimmerman | |
| 7,205,533 B2 | * | 4/2007 | Hingst | ........................... 165/156 |
| 7,216,696 B2 | * | 5/2007 | Ferraro | .......................... 165/156 |

(Continued)

OTHER PUBLICATIONS

International Ground Source Heat Pump Association (IGSHPA) website is at http://www.igshpa.okstate.edu/geothermal/geothermal.html; The IGSHPA was established in 1987.

(Continued)

*Primary Examiner* — Leonard R Leo
(74) *Attorney, Agent, or Firm* — Harold G. Furlow, Esq.

(57) ABSTRACT

The present invention relates to a conduit for use in a geothermal heating and cooling system wherein said conduit comprises 2 or more pipes, wherein said 2 or more pipes are twisted together, wherein further that said 2 or more twisted pipes are twisted around a central pipe, further provided that the functions of said central pipe include, but are not limited to, serving as a conduit for a tremie pipe, serving as a support pipe, serving as an insulating pipe or serving as a tremie pipe.

4 Claims, 14 Drawing Sheets

(56) References Cited

U.S. PATENT DOCUMENTS

| | | |
|---|---|---|
| 7,255,096 B2 | 8/2007 | Craig et al. |
| 7,380,584 B2 | 6/2008 | Ippoushi et al. |
| 7,575,047 B2 | 8/2009 | Lackinger et al. |
| 2006/0137880 A1 | 6/2006 | Figenschou et al. |
| 2007/0029067 A1 | 2/2007 | Kidwell et al. |
| 2007/0187067 A1* | 8/2007 | Horiguchi et al. ............ 165/154 |
| 2008/0289795 A1 | 11/2008 | Hardin et al. |
| 2009/0071639 A1 | 3/2009 | Numata et al. |
| 2009/0107650 A1 | 4/2009 | Feldmann |
| 2009/0321417 A1 | 12/2009 | Burns |
| 2010/0025008 A1 | 2/2010 | Walford |
| 2010/0270002 A1* | 10/2010 | Parrella ........................ 165/45 |

OTHER PUBLICATIONS

Summit Mechanical (Summit) website at www.summitmechsystems.com/pages/3.1.html; 2009.

www.renewableheating101.com/geothermal/loops; 2009; see https://plus.google.com/101321559606193611805/.

http://minnesotageothermalheatpumpassociation.com/geothermal website address; 2009; Minnesota Geothermal Heat Pump Association.

http://www.informedbuilding.com/Geothermal/Main16/Types-of-Geotherm now located at http://www.informedbuilding.com/content/view/17/68/ for geothermal; 2009; Informed Building.

* cited by examiner

TWISTED CONDUIT FOR GEOTHERMAL HEATING AND COOLING SYSTEMS

This application is a Continuation-in-Part of U.S. Ser. No. 12/660,226, filed on Feb. 23, 2010. The entire contents of said application is hereby incorporated by reference.

BACKGROUND OF THE INVENTION

A. Field of the Invention

The present invention relates to a conduit comprising 2 or more pipes that are twisted together. Said conduit is an integral part of a geothermal heating and cooling system. Geothermal heating and cooling systems are known for their superior performance in delivering efficient heating and cooling to homes, industrial buildings and residential and industrial complexes, as well as being environmentally clean and cost effective. See, for example,
http://www.igshpa.okstate.edu/geothermal/geothermal.html;
www.summitmechsystems.com/pages/3.1.html;
www.renewableheating101.com/geothermal/loops;
http://minnesotageothermalheatpumpassociation.com/geothermal/earth-loop-options/; and http://www.informed-building.com/Geothermal/Main16/Types-of-Geotherm.
However, a barrier to the wide spread use of geothermal heating and cooling systems is the high cost of installation of the ground loop of pipes that the system requires. Also, the presently available ground-loop pipes are not ideal in terms of heat transfer and utilization of the borehole required to install the vertical ground loop pipes.

B. Description of the Related Art

The art has attempted to overcome these barriers to market entry for this efficient heating and cooling system. The aforementioned websites discuss the currently available ground loop technology. For example, the commonly used ground loop technologies are: horizontal ground loops, vertical ground loops, and slinky coil ground loops. However, horizontal ground loops require a substantial amount of land. Currently available vertical loops, including multiple pipe vertical loops use less land, but their configuration does not optimize heat transfer, as does the present invention. Finally, the slinky coil ground loop is a variation of the horizontal ground loop and it too requires a substantial amount of land.

Also, inventors have sought patents on conduits to solve the problems with the current technology. For example, U.S. Pat. No. 5,630,447 ('447) discloses a pipe design that utilizes the entire borehole; and therefore transfers more heat to the ground. Further, the '447 invention allows for reduction in the size of the borehole required for a pipe capable of handling a specified flow of heat transfer fluid. The '447 invention, however, has some limitations. Said limitation being the pipe design and the cost of said design both in terms of time and money. The standards set by ASTM specify that pressure pipes have a round configuration. The pressure rating is derived by a combination of material strength and diameter to pipe wall thickness ration. The smaller this ration the higher the pressure rating of the pipe will be. The pipe represented in U.S. Pat. No. 5,630,447 is not round according to the standard, set by ASTM, to determine pressure tolerance of a pipe, and therefore cannot be governed by the same standard. Thus, new standards will need to be written and approved by standard setting bodies such as ASTM and IGSHPA. This process could be costly and time consuming. Additionally the U.S. '447 pipe inherently keeps the heat transferring fluid in the in and out flow pipes in close proximity to each other; thus causing heat contamination from the inflow to the outflow pipe. U.S. Pat. No. 5,630,447 does address this problem by introducing the notion of an insulating space between the inflow and outflow pipe. However, this design further complicates the pipe design certification issues.

Finally, U.S. Pat. No. 5,477,914 ('914) discloses a ground source heat exchanger unit comprising a primary conduit and a plurality of secondary conduits for receiving heat transfer fluid. Said secondary conduits are spaced apart from each other. The '914 system is not designed for optimal use of the borehole due to the spacing between the secondary conduits. FIG. 1 of the '914 disclosure illustrates the fact that the '914 system requires greater land usage than a typical narrow borehole installation. Since the borehole is a very costly part of the installation of these systems, the '914 design becomes costly to install because of the larger diameter borehole required by the '914 system.

The '914 system will be inherently more cumbersome to manage because of the flexibility of the pipe in conjunction with the spacing required between the pipes. Specifically, it will be difficult to install the '914 invention in vertical boreholes and trenches because the pipes will tend to become disarranged from their designed arrangements. This is especially true when the installation takes place in a vertical borehole filled with water. The '914 inventor suggests a solution. He uses spacers installed at intervals on the pipe. However, this increases the cost of assembly and transportation of the '914 system.

Also, the '914 invention uses an insulated pipe. Said insulated pipe does not contribute to the heat transfer process while occupying space in the borehole, and system efficiency is compromised.

Vertical borehole installations of the ground loop are usually required to be at least partially grouted. To optimize heat transfer it is common to grout the entire bore. This is accomplished by the insertion of a grout pipe all the way to the bottom of the bore. This grout pipe can sometimes be very difficult to insert into the bore as it has a tendency to catch on various irregular surfaces. The added spacers in the '914 configuration in conjunction with the space between pipes will make inserting this grout pipe cumbersome and laborious because the pipe may get caught on the spacers.

Applicant's invention overcomes the problems with the art. Specifically, Applicant twists 2 or more pipes together, making more efficient use of the bore hole space by placing more pipe into the borehole; thus creating more heat transfer surface area than the presently available pipe configurations. Because the 2 or more pipes are twisted together, said twisted pipes will support one another during installation. Further, said twisted pipe arrangement is easily rolled up and transported to a job site.

Also, the conduit of the present invention allows for greater thermal transfer from pipe to ground. If desired, the grouting material may be replaced by air or any insulating gas; thus, promoting pipe-to-pipe insulation.

Finally, the conduit of the present invention can be manufactured from existing components and use in the market can begin almost immediately.

SUMMARY OF THE INVENTION

The present invention relates to a conduit for use in a geothermal heating and cooling system wherein said conduit comprises 2 or more pipes, wherein further, said 2 or more pipes comprising said conduit are twisted together.

The present invention also relates to a conduit for use in a geothermal heating and cooling system wherein said conduit comprises 2 or more pipes, wherein further, said 2 or more pipes comprising said conduit are twisted together, further provided that said 2 or more twisted pipes comprising said conduit are arranged to be contiguous, arranged to be separated or arranged so that said 2 or more twisted pipes have both contiguous pipes and separated pipes.

The present invention further relates to a conduit for use in a geothermal heating and cooling system wherein said conduit comprises 2 or more pipes, wherein further, said 2 or more pipes are twisted together, further provided that said 2 or more twisted pipes are twisted around a central pipe.

The present invention also relates to a conduit for use in a geothermal heating and cooling system wherein said conduit comprises 2 or more pipes, wherein further said 2 or more pipes are twisted together, further provided that said 2 or more twisted pipes are twisted around a central pipe, wherein further said twisted pipes are contiguous, separated, or both continuous and separated.

The present invention relates to a conduit for use in a geothermal heating and cooling system wherein said conduit comprises 2 or more pipes, wherein further said 2 or more pipes are twisted together, further provided that said 2 or more twisted pipes are twisted around a central pipe, wherein further the functions of said central pipe include, but are not limited to, serving as a conduit for a tremie pipe, serving as a support pipe, serving as an insulating pipe or serving as a tremie pipe; further provided that said twisted pipes are contiguous, separated, or both continuous and separated.

The present invention further relates to a conduit for use in a geothermal heating and cooling system wherein said conduit comprises 2 or more pipes, wherein further, said 2 or more pipes are twisted together, further provided that said 2 or more twisted pipes are twisted around a central pipe, wherein further said central pipe is perforated, corrugated or both perforated and corrugated.

DEFINITIONS AND USAGES OF TERMS

Figure 1:
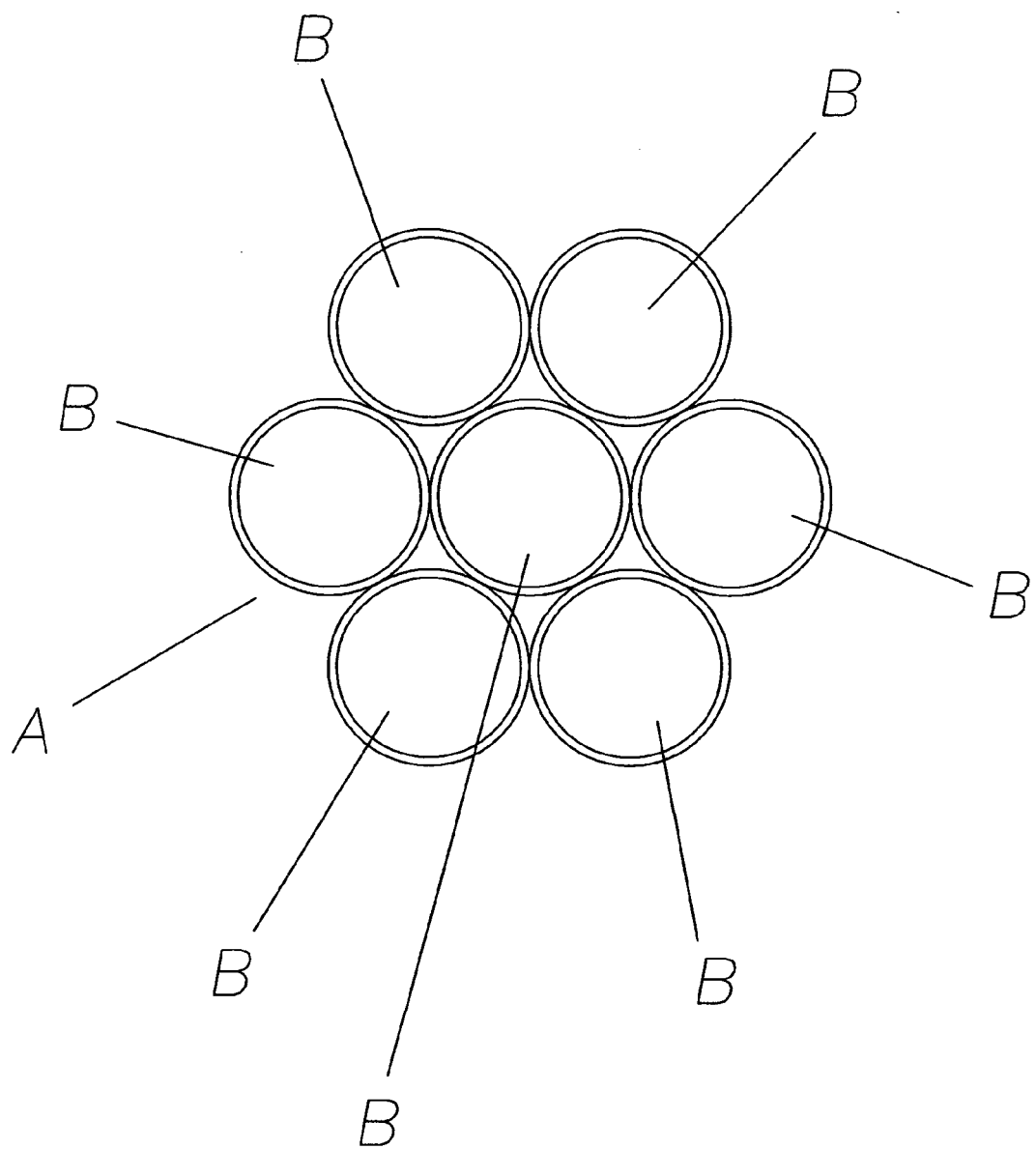
FIG. 1 is a cross sectional view of an embodiment of the conduit of the present invention.

The term "borehole", as used herein, means a narrow shaft drilled in the ground for the purpose of installing a pipe. The borehole can be in a vertical direction, in a horizontal direction, in a diagonal direction or even deviated (i.e. turning). A borehole shaft is advantageous since it is narrow and requires less space and costly excavation and installation.

The term "ASTM standards", as used herein, means the standards that must be complied with in order to produce pipe for geothermal heating and cooling systems. IGSHPA has installation guidelines that specify the piping systems that meet ASTM standards.

The term "tremie pipe", as used herein, means a pipe that is inserted into the borehole to facilitate the filling of the borehole with grout.

The term "contiguous", as used herein, means touching, contacting, or abutting.

The term "inflow", as used herein, refers to the movement of the fluid in the pipes in a vertical direction away from the structure to be heated or cooled and into the earth.

The term "outflow", as used here, refers to the movement of the fluid in the pipes in a vertical direction toward the structure to be heated or cooled.

The number and arrangement of the inflow and outflow pipes is at the discretion of the assembler. There need not be an equal number of inflow and out flow pipes.

As used herein, a "spacing member" is optionally used to separate the pipes. Additionally, said spacing member may optionally serve as an insulating material (i.e an insulator). Said insulating material is a foam or non foam material that is flexible enough to follow the contours of the conduit in any embodiment of the present invention.

The term "twisted", as used herein, means that the pipes comprising the conduit of the present invention are wound or intertwined together or wound around a straight pipe.

The term "gap" as used herein means a space or separation in between the pipes. A spacing member may or may not be used to create the gap.

DETAILED DESCRIPTION OF THE INVENTION

The present invention relates to a conduit for use in a geothermal heating and cooling system wherein said conduit comprises 2 or more pipes, wherein further, said 2 or more pipes comprising said conduit are twisted together.

The present invention also relates to a conduit for use in a geothermal heating and cooling system wherein said conduit comprises 2 or more pipes, wherein further, said 2 or more pipes comprising said conduit are twisted together, further provided that said 2 or more twisted pipes comprising said conduit are arranged to be contiguous, arranged to be separated or arranged so that said 2 or more twisted pipes have both contiguous pipes and separated pipes.

The present invention further relates to a conduit for use in a geothermal heating and cooling system wherein said conduit comprises 2 or more pipes, wherein further, said 2 or more pipes are twisted together, further provided that said 2 or more twisted pipes are twisted around a central pipe.

The present invention also relates to a conduit for use in a geothermal heating and cooling system wherein said conduit comprises 2 or more pipes, wherein further said 2 or more pipes are twisted together, further provided that said 2 or more twisted pipes are twisted around a central pipe, wherein further said twisted pipes are contiguous, separated, or both continuous and separated.

The present invention relates to a conduit for use in a geothermal heating and cooling system wherein said conduit comprises 2 or more pipes, wherein further said 2 or more pipes are twisted together, further provided that said 2 or more twisted pipes are twisted around a central pipe, wherein further the functions of said central pipe include, but are not limited to, serving as a conduit for a tremie pipe, serving as a support pipe, serving as an insulating pipe or serving as a tremie pipe; further provided that said twisted pipes are contiguous, separated, or both continuous and separated.

The present invention further relates to a conduit for use in a geothermal heating and cooling system wherein said conduit comprises 2 or more pipes, wherein further, said 2 or more pipes are twisted together, further provided that said 2 or more twisted pipes are twisted around a central pipe, wherein further said central pipe is perforated, corrugated or both perforated and corrugated.

The Conduit of the Present Invention Comprises 2 or More Twisted Pipes

Any number of twisted pipes may comprise the conduit of the present invention. In other words, the number of twisted pipes used to create the conduit of the present invention is at the discretion of the designer.

In an embodiment of the invention, 2-20 twisted pipes comprise the conduit. In another embodiment of the invention, 4-15 twisted pipes comprise the conduit. In yet another embodiment of the invention, 7-10 twisted pipes comprise the conduit. In a further embodiment, 7 twisted pipes comprise the conduit, wherein 6 of said pipes are twisted around a central pipe.

The Arrangement of the 2 or More Twisted Pipes

Any number of twisted pipe arrangements are possible. In a non-limiting embodiment, 2 pipes are twisted together. In another non-limiting embodiment, 4 pipes are twisted together. In a further non-limiting embodiment, 2 pipes are twisted around a central pipe. In yet another non-limiting embodiment 6 pipes are twisted together. In still another non-limiting embodiment, 8 pipes are twisted around a central pipe. In a further non-limiting embodiment, 16 pipes are twisted around a central pipe. Additionally, 20 pipes may be twisted together.

Further, the 2 or more twisted pipes of the conduit of the present invention can be arranged in contiguous fashion, arranged to be separated by a spacing member, or arranged so that said conduit comprised of said twisted pipes has both contiguous and separated twisted pipes. By way of a non limiting example, 2 twisted pipes may be contiguous or said 2 twisted pipes may have a spacing member between them.

Additionally, said 2 or more twisted pipes need not be contiguous or separated by a spacing member. In other words, the twisted pipes may simply have gaps (i.e separations or spaces) between them. In other words, a spacing member is not used to create gaps between the pipes. In an embodiment of the invention, said twisted pipes may be loosely twisted, leaving gaps between said pipes.

One skilled in the art understands that the number and arrangement of twisted inflow and outflow pipes is at the discretion of the assembler and based on the needs of the user of the geothermal system. By way of non- limiting example, in a 7 twisted pipe arrangement, 4 twisted pipes can be inflow and 3 twisted pipes can be outflow, or 3 twisted pipes can be inflow and 4 twisted pipes can be outflow. Further non-limiting examples of inflow and out flow pipe arrangements include, 3 twisted in flow pipes and 3 twisted outflow pipes and one central pipe; 1 twisted inflow pipe and 5 twisted outflow pipes twisted around a central pipe. Said twisted inflow or outflow pipes may be arranged in contiguous fashion, arranged to be separated by a spacing member, or arranged so that said conduit comprised of said 2 or more twisted pipes has both contiguous and separated pipes. In the case of a 2 pipe twist, one pipe will be inflow and the other pipe will be outflow.

In a further embodiment of the invention, twisted inflow and outflow pipes may be grouped together. For example, an embodiment of the invention may be a group of 3 twisted inflow pipes and a group of 3 twisted outflow pipes. In another embodiment, twisted inflow pipes may alternate with twisted outflow pipes. In other words, the arrangement of pipes may be twisted inflow pipe-twisted outflow pipe-twisted inflow pipe-twisted outflow pipe. Said alternating inflow and out flow pipes may be separated or contiguous as described hereinabove.

In another embodiment of the invention, the 2 or more twisted pipes are twisted around a central pipe; and said twisted pipes are contiguous.

In a further embodiment of the invention, the 2 or more twisted pipes are twisted around a central pipe; and said twisted pipes are separated.

In a further embodiment of the invention, the 2 or more twisted pipes are twisted around a central pipe, wherein further said central pipe is a conduit for a tremie pipe.

In another embodiment of the invention, the 2 or more twisted pipes are twisted around a central pipe, wherein further said central pipe is a tremie pipe.

In another embodiment of the invention, the 2 or more twisted pipes are twisted around a central pipe, wherein further said central pipe is a support pipe for keeping said twisted pipes in place.

In another embodiment of the invention, the 2 or more twisted pipes are twisted around a central pipe, wherein further said central pipe is an insulating pipe.

In an embodiment of the invention, the 2 or more twisted pipes are twisted around a central pipe, wherein further said twisted pipes are contiguous; further provided that said central pipe may serve as a conduit for a tremie pipe.

In an embodiment of the invention, the 2 or more twisted pipes are twisted around a central pipe, wherein further said twisted pipes are contiguous; further provided that said central pipe may serve as a tremie pipe.

In an embodiment of the invention, the 2 or more twisted pipes are twisted around a central pipe, wherein further said twisted pipes are contiguous; further provided that said central pipe may serve as a support pipe for keeping said twisted pipes in place.

In an embodiment of the invention, the 2 or more twisted pipes are twisted around a central pipe, wherein further said twisted pipes are contiguous; further provided that said central pipe may serve as a conduit for an insulating pipe.

In an embodiment of the invention, the 2 or more twisted pipes are twisted around a central pipe, wherein further said twisted pipes are separated; further provided that said central pipe may serve as a conduit for a tremie pipe.

In an embodiment of the invention, the 2 or more twisted pipes are twisted around a central pipe, wherein further said twisted pipes are separated; further provided that said central pipe may serve as a tremie pipe.

In an embodiment of the invention, the 2 or more twisted pipes are twisted around a central pipe, wherein further said twisted pipes are separated; further provided that said central pipe may serve as a support pipe for keeping said twisted pipes in place.

In an embodiment of the invention, the 2 or more twisted pipes are twisted around a central pipe, wherein further said twisted pipes are separated; further provided that said central pipe may serve as an insulating pipe.

In still another embodiment of the invention, the 2 or more twisted pipes are twisted around a central pipe, wherein said central pipe is perforated.

In an embodiment of the invention, the 2 or more twisted pipes are twisted around a central pipe, wherein said central pipe is corrugated Typically, the pipes useful in the present invention are plastic. Plastic materials suitable for piping include polyvinyl chloride (PVC), chlorinated polyvinyl chloride (CPVC), fibre reinforced plastic (FRP), reinforced polymer mortar (RPMP), polypropylene (PP), polyethylene (PE), cross-linked high-density polyethylene (PEX), polybutylene (PB), and acrylonitrile butadiene styrene (ABS), PEX/Aluminium/PEX, for example. In an embodiment of the invention, PE and PEX are preferred.

The Central Pipe

In an embodiment of the invention, there is a central pipe. The functions of said central pipe include, but are not limited to, serving as a conduit for a tremie pipe, serving as a tremie pipe, serving as a support pipe for keeping the twisted pipes in place, serving as an insulating pipe and serving any combination of the aforementioned functions.

Further, said central pipe may have perforations along its length. Said perforations may be of any shape. Non limiting examples of shapes include, but are not limited to, circles, ovals, squares, rectangles, and triangles. Said shapes are spaced at intervals along the length of the central pipe at the discretion of the designer or manufacturer. In an embodiment of the invention, a circular perforation may have a diameter ranging from ¼ inch to 1 inch.

Further, said central pipe may be corrugated.

The twisted pipes of the present invention may be contiguous or separated. If separation of said twisted pipes is desired, a spacing member may be used or the separation may be achieved by simply leaving gaps between the twisted pipes. If a spacing member is used, said spacing member may optionally serve as an insulating material (i.e an insulator). Said insulating material is a foam or non foam material that is flexible enough to follow the contours of the conduit In an embodiment of the present invention, said optional spacing member may be a single unit piece. In a further embodiment of the invention, individual spacing members may be inserted between the pipes. The use and location of the spacing members is at the discretion of the designer.

Non Limiting Embodiments of the Invention are Illustrated in FIGS. 1-7

A conduit of the present invention comprised of twisted pipes arranged in a contiguous fashion is embodied in cross sectional FIG. 1. As illustrated in cross sectional FIG. 1, said twisted pipes (B) comprising said conduit (A) are arranged in a contiguous fashion. In other words, all the twisted pipes (B) are touching.

Figure 1A:
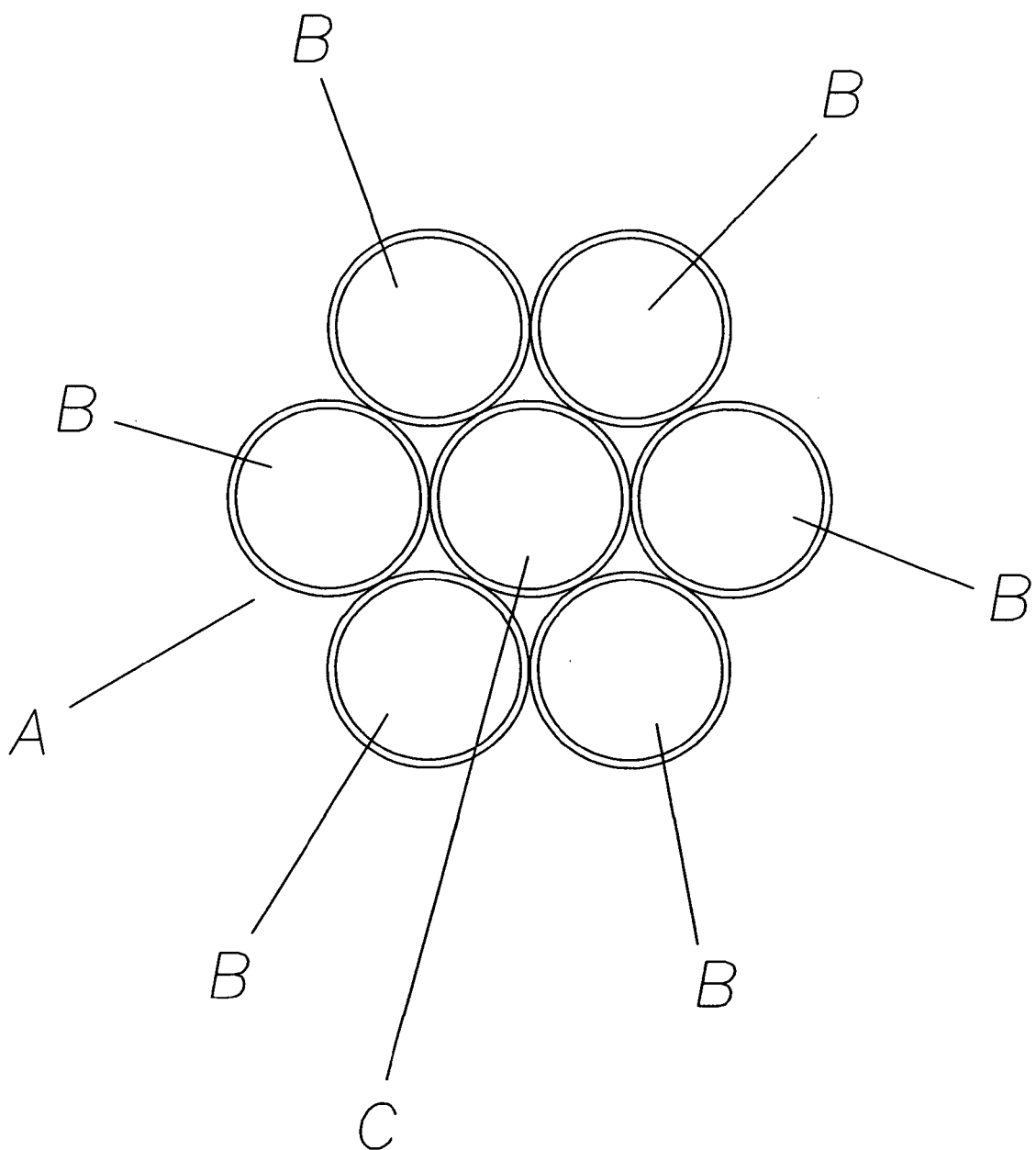
FIG. 1a is a cross sectional view of an embodiment of the conduit of the present invention.
Figure 1B:
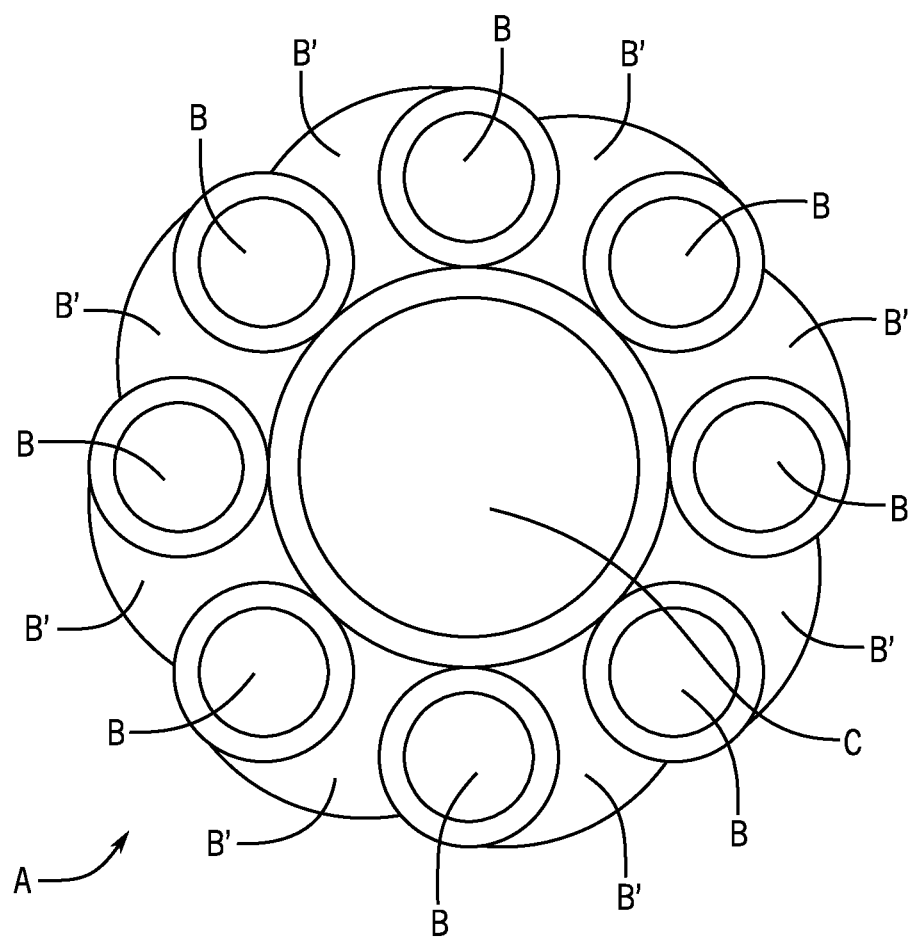
FIG. 1b is a cross sectional view of an embodiment of the conduit of the present invention.

A conduit of the present invention comprised of twisted pipes arranged in a contiguous fashion and comprising a central pipe is embodied in cross sectional FIG. 1a. As illustrated in FIG. 1a, said twisted pipes (B) comprising said conduit (A) are arranged in a contiguous fashion. In other words, all the twisted pipes (B) are touching the central pipe (C):

A conduit of the present invention comprised of twisted pipes having gaps between said twisted pipes and having a central pipe is embodied in cross sectional FIG. 1b. As illustrated in FIG. 1b, said twisted pipes (B) comprising said conduit (A) are arranged so that said twisted pipes (B) are separated by gaps (B'). In other words, all the twisted pipes (B) have gaps (B') in between them. Said twisted pipes (B) are arranged around a central pipe (C).

Figure 2:
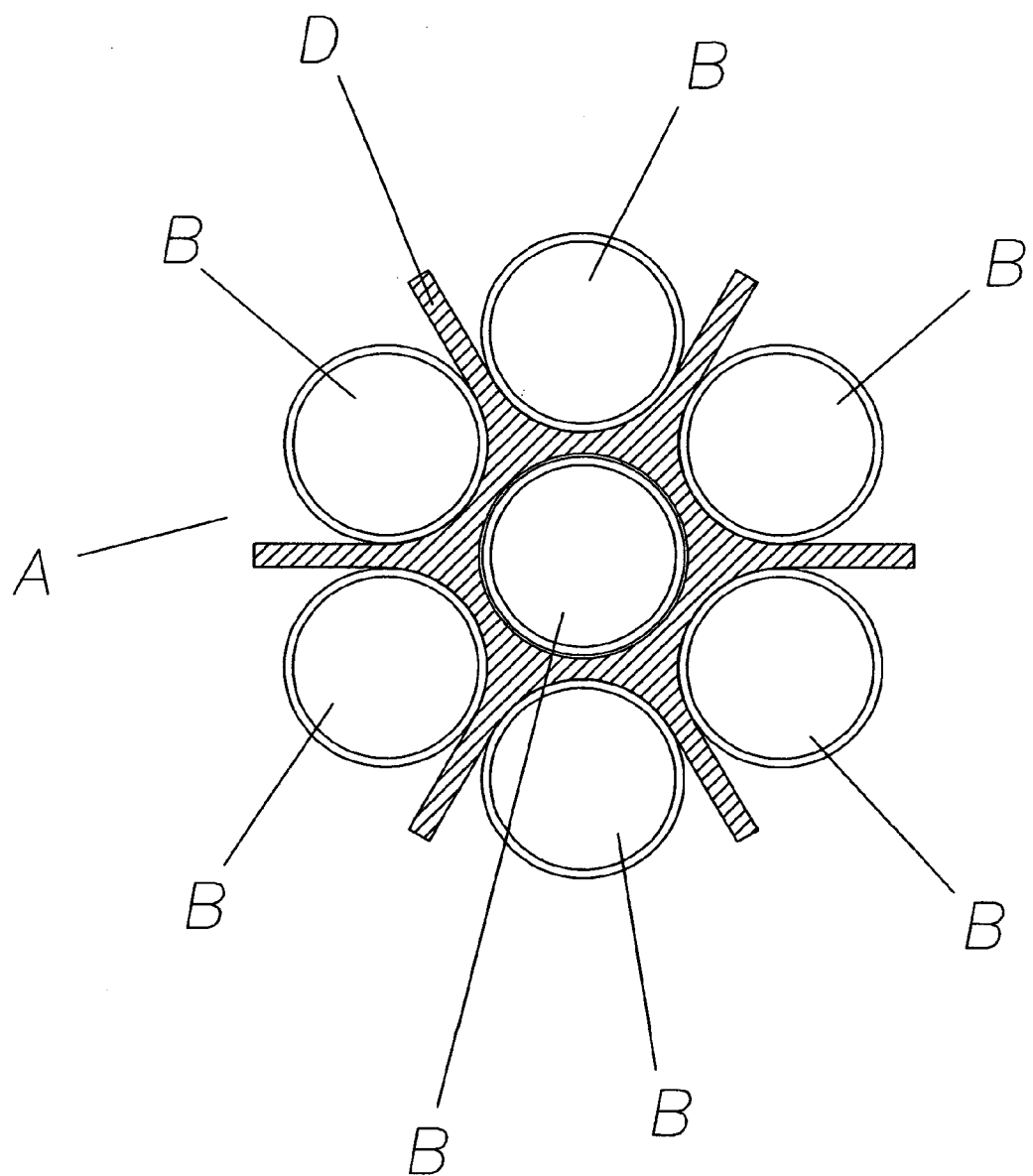
FIG. 2 is a cross sectional view of an embodiment of the conduit of the present invention.

A conduit of the present invention comprised of twisted pipes arranged to be separated by a spacing member is embodied in cross sectional FIG. 2. As illustrated in FIG. 2, said twisted pipes (B) comprising said conduit (A) are arranged to be separated by a spacing member (D). In the FIG. 2 embodiment, said spacing member (D) is a single unit piece separating all the twisted pipes (B) in the conduit (A).

Figure 3:
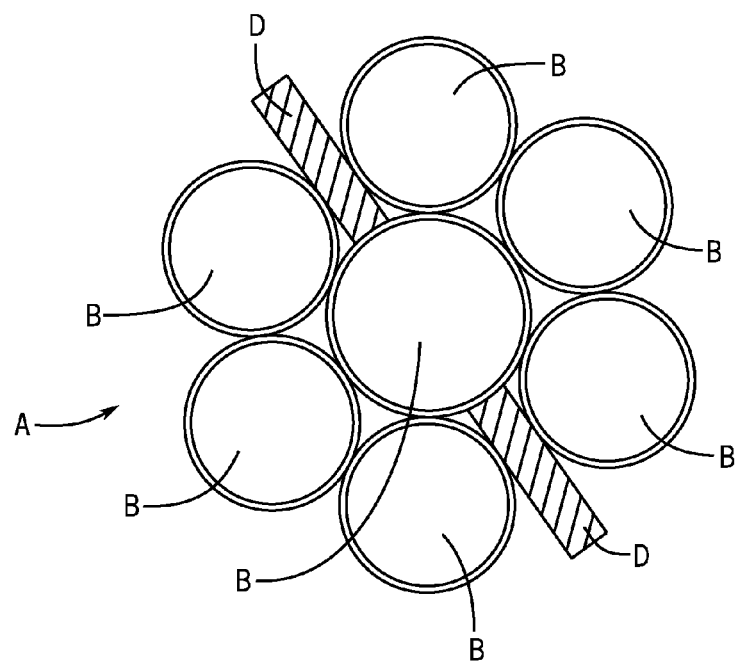
FIG. 3 is a cross sectional view of an embodiment of the conduit of the present invention.

A conduit of the present invention comprised of twisted pipes arranged in a contiguous and separated arrangement is embodied in cross sectional FIG. 3. As illustrated in FIG. 3, said twisted pipes (B) comprising said conduit (A) are arranged so that said twisted pipes (B) have both contiguous twisted pipes (B) and twisted pipes (B) separated by a spacing member (D).

Further, when using the FIG. 3 contiguous and separated pipe arrangement, the contiguous and separated pipes can be in any number of patterns. Non limiting examples include, 3 twisted pipes touching (i.e. contiguous) and 2 twisted pipes separated by spacing members, 3 twisted pipes each separated by spacing members and 3 twisted pipes touching. In yet another embodiment, 3 twisted pipes are touching (i.e. contiguous), a spacer is present, then 3 more twisted pipes that are touching (i.e. contiguous) are present, and said twisted pipes are connected to the former three twisted pipes by a spacer.

Figure 4:
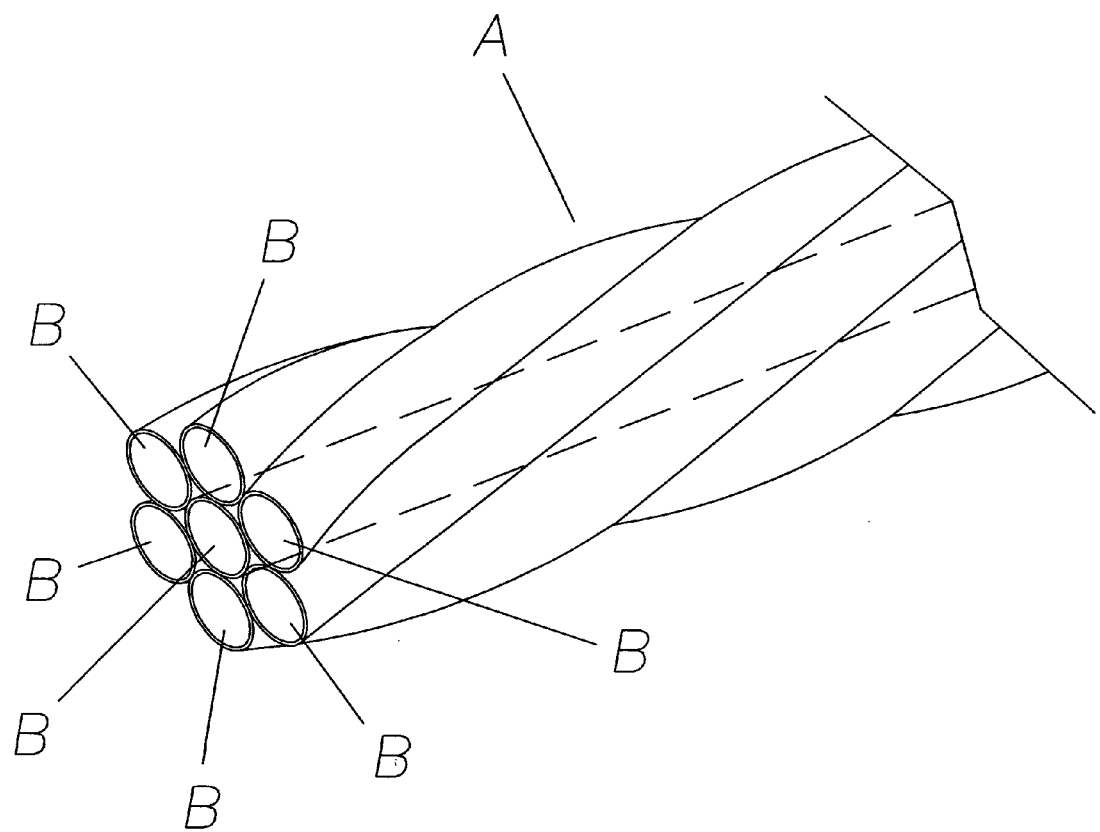
FIG. 4 is a side view of an embodiment of the conduit of the present invention.

FIG. 4 is a side view schematic of the conduit (A) of the present invention comprising 2 or more twisted pipes (B). Said twisted pipes (B) are contiguous. Referring to FIG. 4, said pipes (B) comprising said conduit (A) are twisted together.

Figure 4A:
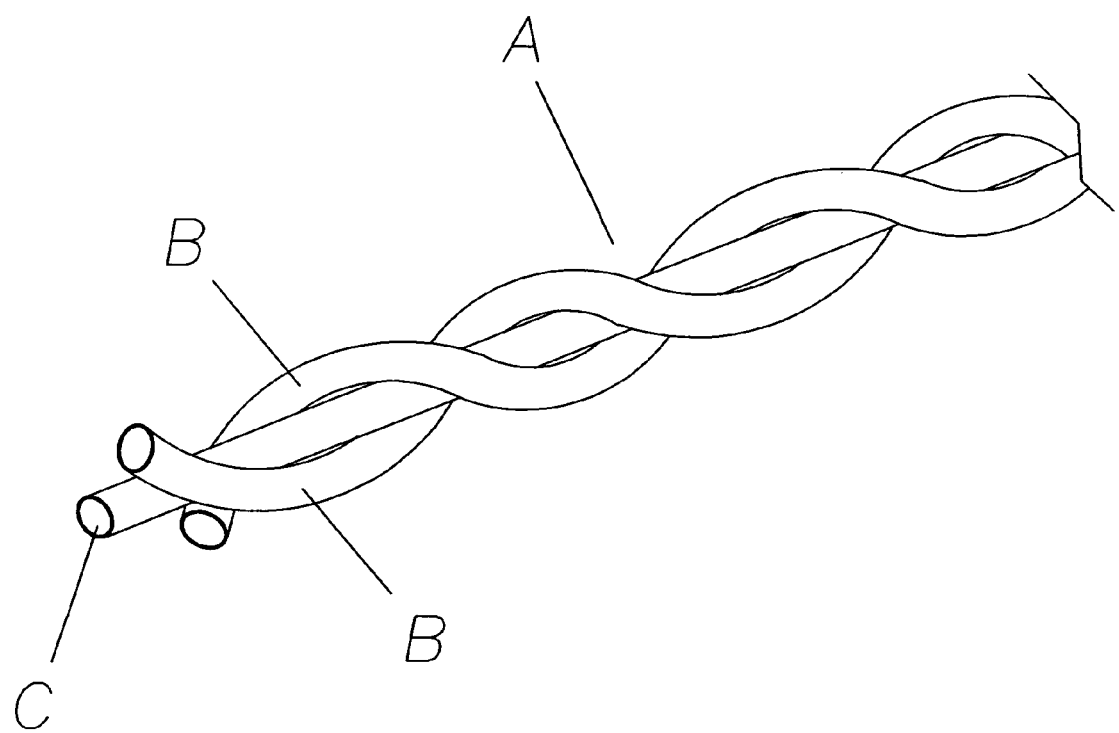
FIG. 4a is a side view of an embodiment of the conduit of the present invention.

FIG. 4a is a schematic of the conduit (A) of the present invention comprising 2 twisted pipes (B). Said 2 twisted pipes (B) are contiguous. Said 2 twisted pipes (B) are twisted around a central pipe (C).

Figure 5:
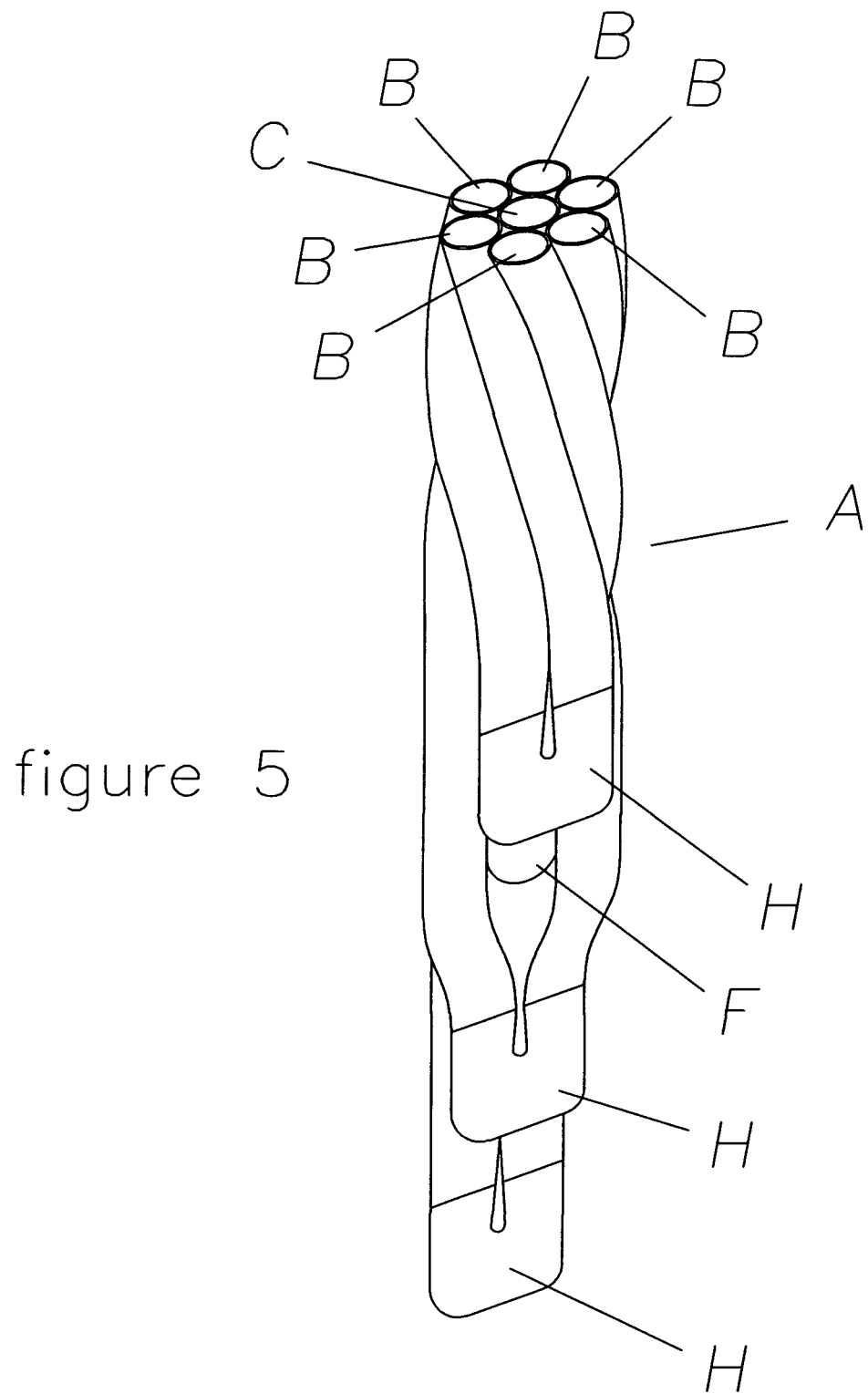
FIG. 5 is a schematic of an embodiment of the conduit of the present invention

FIG. 5 is a schematic of the conduit (A) of the present invention. For example, in FIG. 5, said twisted pipes (B) are arranged around a central pipe (C). Said twisted pipes (B) are contiguous. Said twisted pipes (B) are connected to U bend fittings (H). Said U bend fittings (H) allow the fluid in the twisted pipes (B) to flow in and out of the conduit (A) of the present invention. A central pipe (C) terminates at open-ended point (F).

Figure 5A:
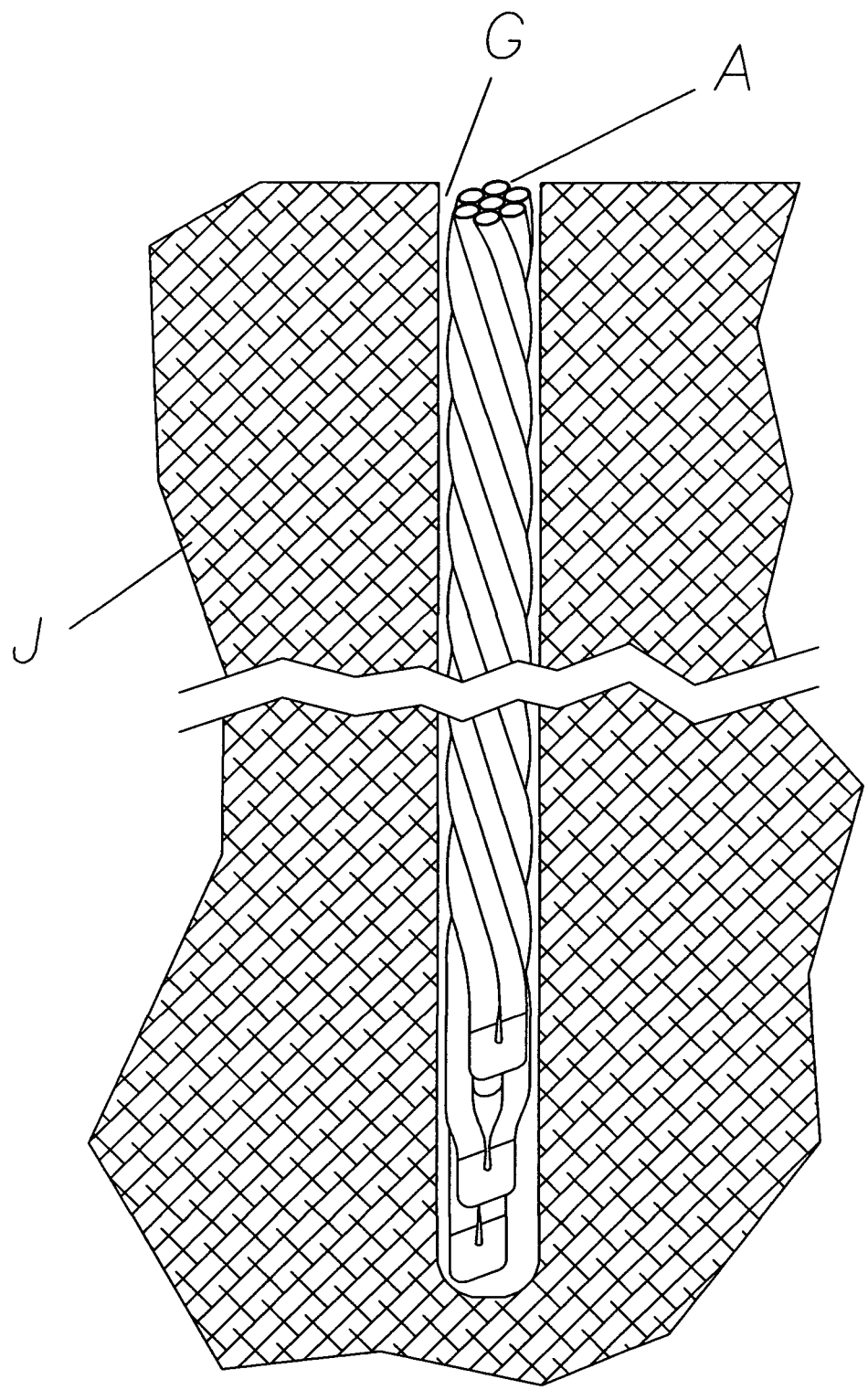
FIG. 5a is a schematic of an embodiment of the conduit of the present invention as installed in a borehole.

FIG. 5a is an embodiment of the conduit (A) of the present invention as it may be installed in a borehole (G). (J) represents the underground area where the bore hole is drilled.

Figure 6:
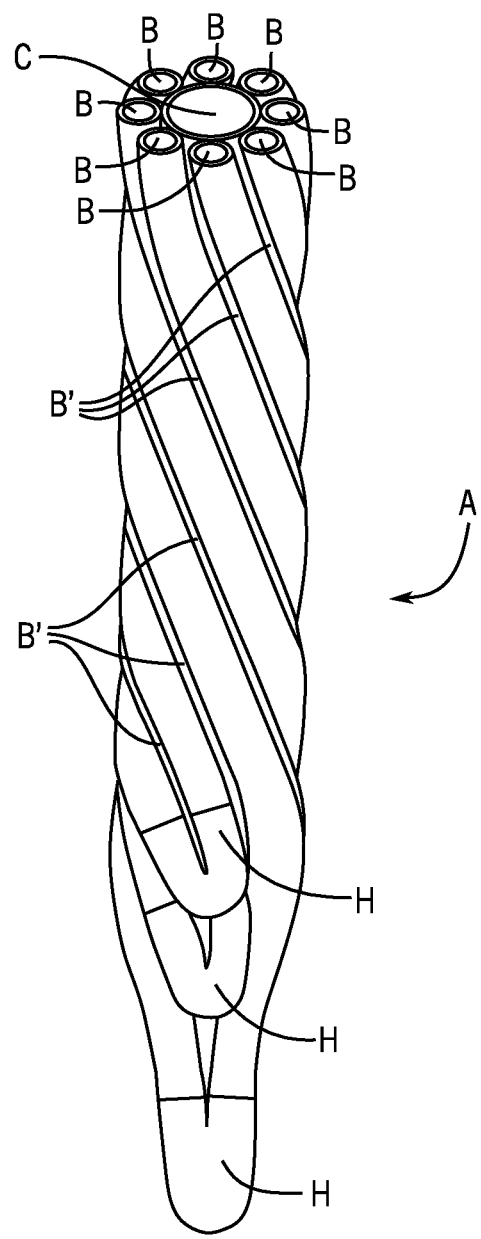
FIG. 6 is a schematic of an embodiment of the conduit of the present invention.

FIG. 6 is a schematic of an embodiment of the conduit (A) of the present invention. For example, in FIG. 6, said twisted pipes (B) are arranged around a central pipe (C). Said twisted pipes (B) are arranged so that said twisted pipes (B) are separated by gaps (B'). In other words, all the twisted pipes (B) have gaps (B') in between them. Said twisted pipes (B) are arranged around a central pipe (C). Said twisted pipes (B) are connected to U bend fittings (H). Said U bend fittings (H) allow the fluid in the twisted pipes (B) to flow in and out of the conduit (A) of the present invention.

Figure 6A:
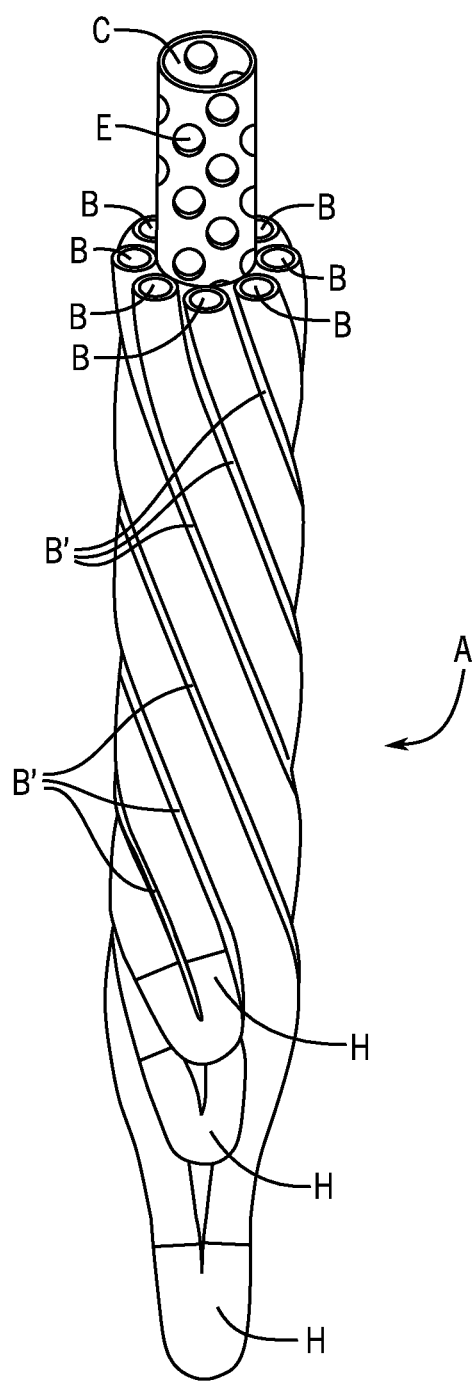
FIG. 6a is a schematic of an embodiment of the conduit of the present invention.

FIG. 6a is a schematic of an embodiment of the conduit (A) of the present invention. For example, in FIG. 6a, said twisted pipes (B) are arranged around a central pipe (C). Said central pipe (D) has perforations (E) along its length. The arrangement of said perforations (E) is at the discretion of the designer or manufacturer. Further, said twisted pipes (B) are arranged so that said twisted pipes (B) are separated by gaps (B'). In other words, all the twisted pipes (B) have gaps (B') in between them. Said twisted pipes (B) are arranged around a central pipe (C) wherein said central pipe (C) has perforations (E) along its length. Said twisted pipes (B) are connected to U bend fittings (H). Said U bend fittings (H) allow the fluid in the twisted pipes (B) to flow in and out of the conduit (A) of the present invention.

Figure 6B:
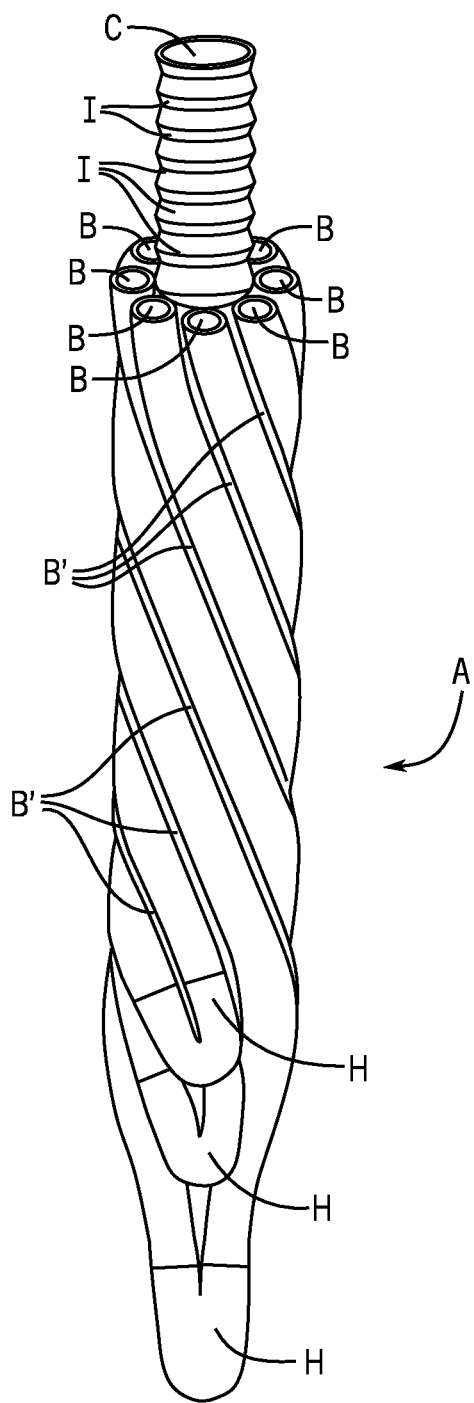
FIG. 6b is a schematic of an embodiment of the conduit of the present invention.

FIG. 6b is a schematic of an embodiment of the conduit (A) of the present invention. For example, in FIG. 6b, said twisted pipes (B) are arranged around a central pipe (C). Said central pipe (C) has corrugations (I) along its length. The arrangement of said corrugations (F) is at the discretion of the designer or manufacturer. Further, said twisted pipes (B) are arranged so that said twisted pipes (B) are separated by gaps (B'). In other words, all the twisted pipes (B) have gaps (B') in between them. Said twisted pipes (B) are arranged around a central pipe (C) wherein said central pipe (C) has corrugations (I) along its length. Said twisted pipes (B) are connected to U bend fittings (H). Said U bend fittings (H) allow the fluid in the twisted pipes (B) to flow in and out of the conduit (A) of the present invention.

Figure 6C:
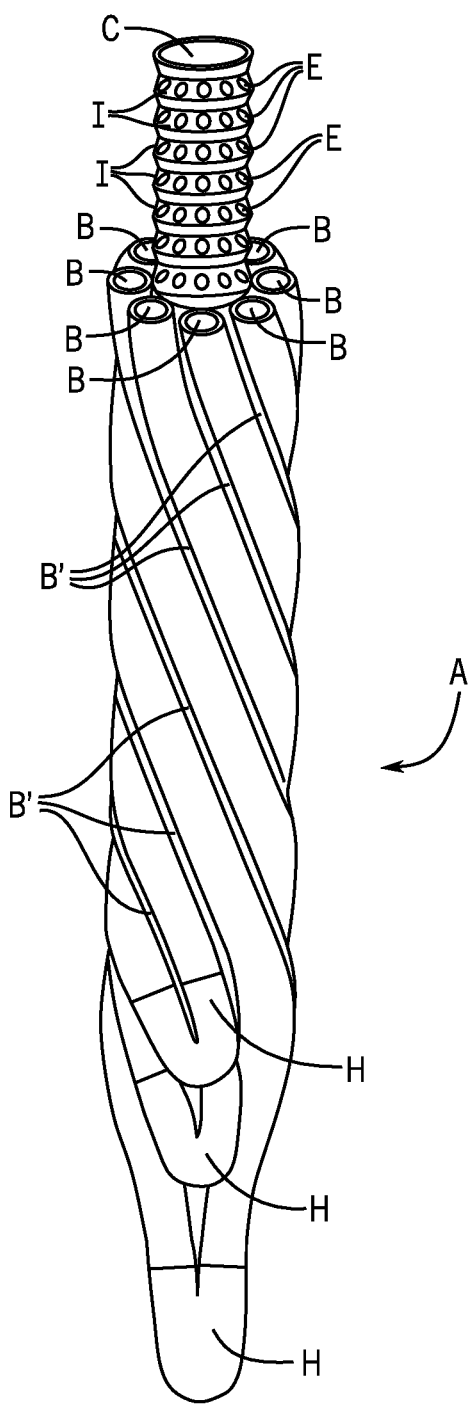
FIG. 6c is a schematic of an embodiment of the conduit of the present invention.

FIG. 6c is a schematic of an embodiment of the conduit (A) of the present invention. For example, in FIG. 6c, said twisted pipes (B) are arranged around a central pipe (C). Said central pipe (C) has perforations (E) and corrugations (I) along its length. The arrangement of said perforations (E) and corrugations (I) is at the discretion of the designer or manufacturer. Further, said twisted pipes (B) are arranged so that said twisted pipes (B) are separated by gaps (B'). In other words, all the twisted pipes (B) have gaps (B') in between them. Said twisted pipes (B) are arranged around a central pipe (C) wherein said central pipe (C) has perforations (E) and corrugations (I) along its length. Said twisted pipes (B) are connected to U bend fittings (H). Said U bend fittings (H) allow the fluid in the twisted pipes (B) to flow in and out of the conduit (A) of the present invention.

Figure 7:
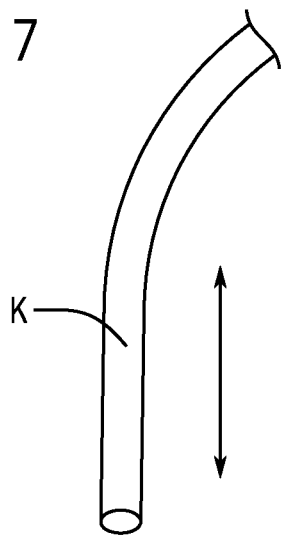
FIG. 7 is a schematic of an embodiment of the conduit of the present invention as installed in a borehole.
Figure 7:
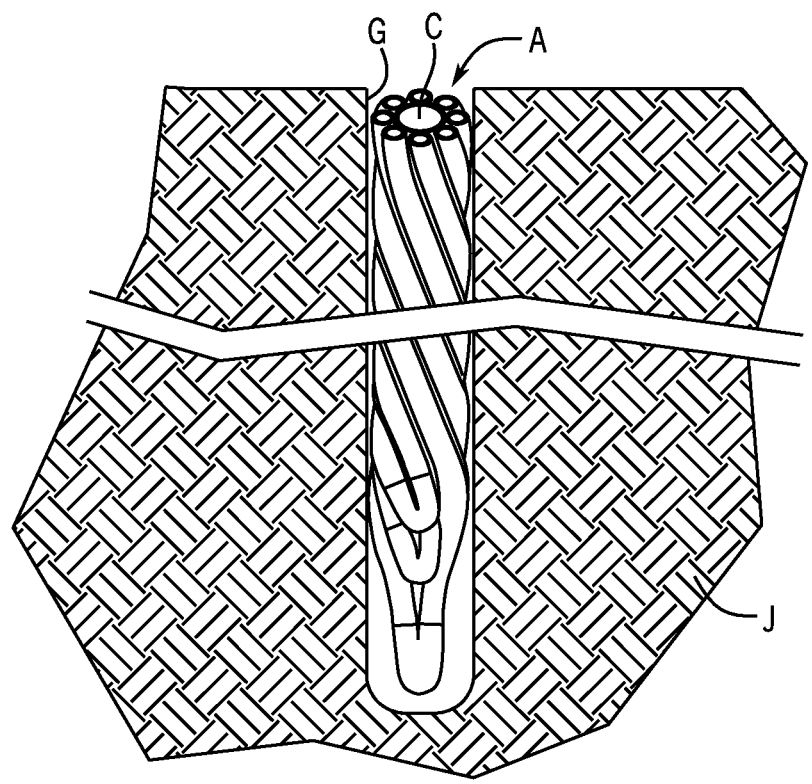

FIG. 7 is an embodiment of the conduit (A) of the present invention as it may be installed in a borehole (G). (J) represents the underground area where the bore hole is drilled. The tremie pipe (K) is inserted into the central pipe (C).

The Conduit of the Present Invention is Formed by Twisting 2 or More Pipes Together Twisting allows for more pipe to be inserted into the borehole and for optimization of the heat transfer surface area. Any number of twisting configurations may be employed in the practice of the present invention. In other words, the 2 or more pipes of the present invention can be twisted in a relatively tighter or looser fashion. The twisting can be clockwise or counter clockwise. Clockwise and counter wise twisting may occur along the same length of pipe. Also, both tighter and looser twists may occur along the same length of pipe. The choice of twisting configurations and twisting directions is at the discretion of the designer.

Installation of the Present Invention

In an embodiment of the invention, the pre-fabricated twisted pipes conduit of the present invention will be transported to the construction site for insertion into the borehole. Optionally, the pipes can be twisted on site. There are several methods of installation (vertical, horizontal, diagonal, deviated). In a further embodiment of the present invention the twisted pipe conduit is installed vertically by means known to those skilled in the art.

I claim:

1. A conduit adapted for use as a geothermal heat exchanger, said conduit comprises: two or more pipes and a central pipe, the central pipe is a tremie pipe, the central pipe is perforated, said two or more pipes are twisted around a perforated portion of the central pipe, said two or more pipes are separated, the two or more pipes are contiguous with the central pipe, the two or more pipes include at least one inflow pipe and at least one outflow pipe, the two or more pipes adapted for geothermal heat exchange.

2. A conduit adapted for use in a geothermal heating and cooling system wherein said conduit comprises two or more pipes and a central pipe, said two or more pipes are twisted around a perforated portion of the central pipe, said central pipe is perforated and the central pipe is a tremie pipe, the two or more pipes are separate, the two or more pipes are contiguous with the central pipe, the two or more pipes include at least one inflow pipe and at least one outflow pipe, the two or more pipes adapted for geothermal heat exchange.

3. The conduit of claim 2, wherein the central pipe is corrugated.

4. A conduit adapted for use in a geothermal heating and cooling system wherein said conduit comprises two or more pipes and a central pipe, said two or more pipes are twisted around the central pipe, the two or more pipes arranged to be contiguous with the central pipe and the two or more pipes arranged to be separated, said central pipe is a tremie pipe, the central pipe corrugated and the central pipe perforated, the two or more pipes includes at least one inflow pipe and at least one outflow pipe, the two or more pipes adapted for geothermal heat exchange.

* * * * *